(12) United States Patent
Park et al.

(10) Patent No.: US 8,377,590 B2
(45) Date of Patent: Feb. 19, 2013

(54) ELECTROCHEMICAL ENERGY STORAGE DEVICE WITH HIGH CAPACITY AND HIGH POWER USING CONDUCTIVE POLYMER COMPOSITE

(75) Inventors: Jong-Hyeok Park, Daejeon (KR); Sang-Young Lee, Daejeon (KR); Ok Joo Lee, Daejeon (KR)

(73) Assignee: LG Chem, Ltd. (KR)

( * ) Notice: Subject to any disclaimer, the term of this patent is extended or adjusted under 35 U.S.C. 154(b) by 748 days.

(21) Appl. No.: 12/226,843

(22) PCT Filed: May 4, 2007

(86) PCT No.: PCT/KR2007/002208
§ 371 (c)(1),
(2), (4) Date: Sep. 29, 2009

(87) PCT Pub. No.: WO2007/129841
PCT Pub. Date: Nov. 15, 2007

(65) Prior Publication Data
US 2010/0055572 A1   Mar. 4, 2010

(30) Foreign Application Priority Data
May 4, 2006   (KR) .................. 10-2006-0040779

(51) Int. Cl.
*H01M 4/60* (2006.01)
*H01M 4/62* (2006.01)
*H01B 1/00* (2006.01)

(52) U.S. Cl. ........ 429/213; 429/217; 252/511; 252/512; 252/519.33

(58) Field of Classification Search ............... 252/182.1, 252/510, 511, 512, 519.33, 519.34; 429/213, 429/217
See application file for complete search history.

(56) References Cited

U.S. PATENT DOCUMENTS

| | | | |
|---|---|---|---|
| 4,728,589 A * | 3/1988 | MacDiarmid et al. ........ 429/213 |
| 5,470,910 A | 11/1995 | Spanhel et al. |
| 5,910,522 A | 6/1999 | Schmidt et al. |
| 5,917,279 A | 6/1999 | Elschner et al. |
| 6,800,155 B2 * | 10/2004 | Senecal et al. ............... 156/62.4 |
| 7,972,537 B2 * | 7/2011 | Meng et al. ................... 252/511 |
| 8,053,113 B2 * | 11/2011 | Oh et al. ....................... 429/217 |

FOREIGN PATENT DOCUMENTS

| | | |
|---|---|---|
| CN | 1155226 A | 7/1997 |
| CN | 1594433 A | 3/2005 |
| EP | 1246205 | 10/2002 |
| JP | 2004136377 A | 5/2004 |
| JP | 2004526838 A | 9/2004 |
| JP | 2004-285278 A | 10/2004 |
| JP | 2005051125 A | 2/2005 |

(Continued)

*Primary Examiner* — Stephen J. Kalafut
(74) *Attorney, Agent, or Firm* — Lerner, David, Littenberg, Krumholz & Mentlik, LLP

(57) ABSTRACT

Disclosed are composite particles comprising: (a) conductive polymer particles; and (b) conductive inorganic nanoparticles having a higher conductivity as compared to the conductive polymer, wherein the conductive inorganic nanoparticles are distributed onto the surface of the conductive polymer particles and/or inside the conductive polymer particles. An electrode comprising the composite particles and an electrochemical device including the electrode are also disclosed. When the composite particles comprising a conductive polymer and conductive inorganic nanoparticles uniformly distributed in the conductive polymer are used for forming an electrode, the amount of electrode active material contributing to the capacity of an electrochemical device increases. Thus, the electrochemical device can provide high capacity and improved lifespan characteristics.

19 Claims, 3 Drawing Sheets

FOREIGN PATENT DOCUMENTS

| | | |
|---|---|---|
| JP | 2007112918 A | 5/2007 |
| KR | 2003-0034740 A | 5/2003 |
| KR | 10-2005-0013512 | 2/2005 |
| WO | 02076724 A1 | 10/2002 |
| WO | 03049219 | 6/2003 |
| WO | 2007129841 | 11/2007 |

* cited by examiner

ELECTROCHEMICAL ENERGY STORAGE DEVICE WITH HIGH CAPACITY AND HIGH POWER USING CONDUCTIVE POLYMER COMPOSITE

CROSS REFERENCE TO RELATED APPLICATIONS

The present application is a national phase entry under 35 U.S.C. §371 of International Application No. PCT/KR2007/002208, filed May 4, 2007, published in English, which claims the benefit of Korean Patent Application No. 10-2006-0040779, filed May 4, 2006. The disclosures of all of said applications are incorporated by reference herein.

TECHNICAL FIELD

The present invention relates to novel composite particles that can impart excellent bindability, adhesive property and conductivity to an electrode, and an adsorption/desorption type electrochemical energy storage device comprising the composite particles.

BACKGROUND ART

In general, an adsorption/desorption type energy storage device includes two electrodes, a separator interposed between the two electrodes for electrically insulating them from each other, an electrolyte and an outer casing for housing the above components. While the conventional battery converts chemical energy into electric energy via redox reactions, the adsorption/desorption type energy storage device stores energy in it via surface adsorption of electric charges. Herein, adsorption of electric charges occurs at the interface between each electrode and the electrolyte, and thus the above energy storage device desirably shows a higher charge/discharge rate as compared to the conventional battery.

Generally, the most important material for forming an electrochemical device based on adsorption/desorption mechanism is an electrode. An electrode generally includes a current collector and an electrode active material adhered onto the current collector. Herein, the current collector and the electrode active material serve to perform electron conduction and electric charge adsorption from an electrolyte, respectively. As the electrode active material for such adsorption/desorption type electrochemical devices, activated carbon is the most widely used, so that many studies have been conducted to increase specific surface area of activated carbon. In addition to activated carbon, electrode active materials that have been used recently include $RuO_2$, $IrO_2$, $MnO_2$ and conductive polymers conducting faradic reactions.

Meanwhile, the quality of an adsorption/desorption type electrochemical device depends on the capacity, voltage and internal resistance thereof. Methods for increasing discharge energy in an electrochemical device based on ion adsorption/desorption mechanism may be classified into the following three types of methods: a method for increasing a cell voltage, a method for reducing the internal resistance of a cell, and a method for developing a novel electrode active material. Among those, methods currently used for increasing a cell voltage in a system using an adsorption/desorption type electrochemical device include a method for connecting a plurality of cells in series. Additionally, many studies have been conducted to reduce the internal resistance of such an electrochemical device by improving physical properties of a binder that allows an electrode active material to be bound to a current collector. Further, many attempts have been made to develop novel electrode active materials. However, any method for imparting high capacity and high output to an electrochemical device while reducing the internal resistance has not been suggested yet.

DISCLOSURE OF THE INVENTION

Technical Problem

Therefore, the present invention has been made in view of the above-mentioned problem. The inventors of the present invention focused their attention to a novel material for forming an electrode, the material functioning not only as a high-quality binder but also as a conductive agent so as to impart high capacity and high output to an electrochemical device while reducing the internal resistance.

In fact, the inventors of the present invention have found that when an electrode is formed by using conductive composite particles comprising polymer particles having excellent adhesion and conductivity and nano-sized inorganic particles having a higher conductivity as compared to the polymer and distributed uniformly onto the surface of the polymer particles or inside the polymer particles, the conductive composite particles can reduce the amount of a conductive agent and a polymer binder currently used for forming an electrode and can serve as a supplementary electrode active material. Thus, it is possible to use the electrode active material in an increased amount and to improve the quality of an electrochemical device. The present invention is based on this finding.

Technical Solution

The present invention provides composite particles comprising: (a) conductive polymer particles; and (b) conductive inorganic nanoparticles having a higher conductivity as compared to the conductive polymer, wherein the conductive inorganic nanoparticles are distributed onto the surface of the conductive polymer particles and/or inside the conductive polymer particles.

The present invention also provides an electrode comprising the composite particles, and an electrochemical device (preferably an adsorption/desorption type electrochemical device) including the electrode.

Hereinafter, the present invention will be explained in more detail.

An adsorption/desorption type electrochemical device stores energy in it via the adsorption of electric charges on the surface of an electrode active material. Generally, two types of methods exist to increase the capacity of such an electrochemical device. The first method includes increasing the specific capacitance of an electrode active material present in a proportion of about 80% in an electrode. The second method includes introducing a novel material capable of functioning as a high-quality binder and conductive agent so as to increase the proportion of an electrode active material, which, otherwise, is about 80% in an electrode.

As an electrode active material of the electrochemical device, activated carbon is generally used. Activated carbon has a relatively low conductivity, while showing a relatively high specific surface area. To allow such activated carbon to be coated on a current collector in the form of a smooth film, a binder, such as a conventional non-conductive binder, is required in a proportion of about 10%. Also, a conductive agent is further introduced in a proportion of about 10% in order to reduce the internal resistance of an electrochemical device. Therefore, the electrode active material occupies about 80% of an electrode as expressed by weight proportion and the remaining 20% of the electrode cannot contribute to the capacity of an electrochemical device.

Under these circumstances, the present invention is characterized by introducing conductive composite particles capable of functioning as an electrode active material, as a binder and as a conductive agent, so as to increase the proportion of materials contributing to the capacity of an electrochemical device in an electrode.

In the case of the conventional electrode, formed by simply mixing an electrode active material (activated carbon), a conductive agent and a conductive polymer, the conductive agent provided in the form of nanoparticles show a strong cohesive force. Such strong cohesive force inhibits the conductive agent from being uniformly distributed around the electrode active material particles. Therefore, such conductive agents are insufficient in terms of the functions required for a conductive agent, including electric connection of the electrode active material in the electrode and conduction and transfer of ions or charges drawn from an electrolyte to the electrode. As a result, an electrochemical device using the conventional electrode causes a drop in the capacity and output even in the presence of a large amount of conductive polymer and electrode active material.

On the contrary, the composite particles according to the present invention comprise polymer particles having excellent bindability and conductivity, and inorganic nanoparticles having a higher conductivity as compared to the polymer, the inorganic nanoparticles being uniformly distributed on the surface of and/or inside the conductive polymer particles (see Table 1).

When the composite particles are used for forming an electrode, the conductive polymer in the composite particles can serve as a binder to make physical and electrical connection among the electrode active material particles and between the electrode active material and a current collector. Also, the conductive inorganic nanoparticles in the composite particles can serve as a conductive agent to allow electric charges to move smoothly (see Table 1).

In fact, the composite particles according to the present invention have physical properties required not only for a binder but also for a conductive agent, i.e. an adhesion of 10 g/cm or more and a conductivity of $10^{-2}$~$10^5$ S/cm. Thus, when the composite particles are introduced into an electrode, they show conductivity comparable to or higher than the conductivity of a carbon-based conductive agent even in the absence of the conductive agent, resulting in a drop in the internal resistance of an electrochemical device. Herein, the composite particles may have an adhesion of 10~100 g/cm, and preferably of 30~50 g/cm.

Additionally, the conductive polymer has a lower conductivity as compared to a conventional conductive agent, while the conductive agent has a relatively high conductivity and shows a strong electron withdrawing force, but has a low specific surface area and a low degree of charge collection. The composite particles according to the present invention include conductive inorganic nanoparticles having a conductivity comparable to the conductivity of a conventional conductive agent. The conductivity of such conductive inorganic nanoparticles causes strong withdrawal of a plurality of electric charges arranged between an electrode and an electrolyte solution. The electric charges withdrawn as mentioned above can be transferred and conducted promptly to the electrode active material with a high specific surface area by way of the conductive polymer connected physically and/or electrically to the conductive inorganic particles in the conductive composite particles. As a result, an electrode using the composite particles can impart high output and high capacity to an electrochemical device, as compared to the conventional electrode obtained by simply mixing a conductive agent with a conductive polymer.

Herein, the charges collected by the conductive inorganic nanoparticles may be partially doped or undoped into repeating units of the conductive polymer. Therefore, the conductive polymer can serve as a supplementary electrode active material participating in charge transfer. Therefore, it is also possible to significantly increase the capacity of an electrochemical device (see FIG. 3).

There is no particular limitation in the composition, shape, etc. of the conductive inorganic nanoparticles, as long as the nanoparticles are conductive inorganic materials and have such a diameter that they can be uniformly dispersed in a conductive polymer.

Herein, the inorganic materials include those generally known to one skilled in the art, and particular examples thereof include simple materials, such as carbonaceous materials, metals, metal oxides, metal alloys, or the like. Non-limiting examples of the inorganic materials that may be used in the present invention include metals, metal oxides, metal alloys, carbonaceous materials and mixtures thereof. Particular examples of the carbonaceous materials include graphite, carbon nanotubes, graphite nanofibers, or the like.

The conductive inorganic nanoparticles may be spherical particles. However, they may be tube-like, fiber-like, rod-like or plate-like particles. Additionally, the conductive inorganic nanoparticles preferably have a nano-scaled size in order to improve the dispersibility of the inorganic particles in a conductive polymer. For example, in the case of spherical conductive particles, the particles may have a diameter of 0.1~500 nm, and preferably of 0.1~100 nm. Conductive inorganic particles other than spherical particles may have a width of 0.1~500 nm and a length of 0.1~10 µm. preferably, such particles may have a width of 0.1~100 nm and a length of 0.1µ2 µm. Even when the tube-like, fiber-like, rod-like or plate-like particles have a micro-scaled length, they can be cut and crushed into nano-scaled particles via ultrasonic treatment, crushing or pH adjustment during the manufacture of an electrode. Thus, the scope of the present invention is not limited to the above ranges.

As mentioned above, when the conductive inorganic particles have a nano-scaled size, they have an increased surface area per weight. Such an increase in surface area is followed by an increase in flow paths through with electrons can move in an electrode, resulting in improvement of high-output characteristics of an electrochemical device.

Additionally, the conductive inorganic particles preferably have a higher conductivity in order to improve charge transfer in an electrochemical device and thus to improve the quality of the electrochemical device. For example, the conductive inorganic particles may have a conductivity of 1 S/cm~$10^5$ S/cm.

The conductive polymer in the composite particles according to the present invention includes one generally known to those skilled in the art.

Preferably, the conductive polymer has a molecular weight of 1,000~1,000,000 so that it serves as a binder sufficiently to allow electrode active material particles to be physically and electrically interconnected and fixed with each other.

Additionally, a polymer that can be swelled and gelled in the presence of a dispersant used for manufacturing an electrode or an electrolyte of an electrochemical device and gelled allows electrode active material particles to be interconnected and fixed with each other merely by being disposed between electrode active material particles, with no need for surrounding the whole electrode active material particles with the polymer. Therefore, such a polymer can maintain uniform adhesion even when used in a smaller amount as compared to a conventional binder with which the whole electrode material particles are surrounded. As a result, it is preferred to use a polymer that can be swelled and gelled in the presence of a conventional electrolyte for an electrochemical device as the conductive polymer.

The composite particles may have modified electron conductivity due to the introduction of a dopant.

Herein, the dopant means a material that is introduced into the repeating units of a conductive polymer to introduce movable charge carriers thereto. There is no particular limitation in the dopant, as long as the dopant can activate charge transfer occurring in the repeating units of a polymer. Particular examples of the dopant include salts soluble in an aqueous or non-aqueous solvent, oxidizing agents, reducing agents, or the like.

The dopant is dissociated in the solution present in an electrochemical device to cause partial charge transfer between conductive polymers, resulting in an increase in the conductivity of the conductive polymer. Therefore, the dopant can significantly increase the conductivity of the finally formed conductive particles.

Non-limiting examples of the conductive polymer that may be used in the present invention include polyaniline, polypyrrole, polythiophene, PEDOT (poly(ethylenedioxy)thiophene), polyacetylene, polyphenylene, poly(thienylene vinylene) or mixtures thereof.

Also, there is no particular limitation in the weight ratio of the conductive nanoparticles and the conduction polymer, a ratio of 0.01~50:50~99.9 being preferred.

There is no particular limitation in the diameter, shape, etc. of the composite particles according to the present invention. Composite particles having a diameter of 100~1,000 nm are preferred.

In addition to the conductive particles and the conductive polymer, the composite particles according to the present invention may further comprise other additives generally known to those skilled in the art.

The conductive composite particles may be prepared by dissolving a conductive polymer into a suitable solvent to form a polymer solution, introducing nanoparticles thereto, and by condensing and drying the resultant mixture. However, the scope of the present invention is not limited thereto.

When the conductive particles introduced to the polymer solution do not have a nano-scaled size, the conductive particles may be crushed before added to the polymer solution. Herein, any conventional crushing methods may be used, a ball mill process being preferred. Also, the condensing and drying steps may be performed via conventional processes.

The solvent preferably has a solubility parameter similar to the solubility parameter of the conductive polymer to be used. Non-limiting examples of the solvent that may be used in the present invention include acetone, tetrahydrofuran, methylene chloride, chloroform, dimethylformamide, N-methyl-2-pyrrolidone, cyclohexane, water or mixtures thereof.

The conductive inorganic particles have a different degree of dispersion stability depending on the surface charge of the conductive particles. Surface charged particles may be stabilized in a solution via an electrostatic force and the surface charge of such conductive particles is generally determined by the acidity (pH) of the solution. Therefore, additives or pH modifiers generally known to those skilled in the art may be used in order to improve the dispersibility of the conductive inorganic particles in the conductive polymer solution. Non-limiting examples of such pH modifiers include acidic materials, such as hydrochloric acid, nitric acid, sulfuric acid, acetic acid, hydrofluoric acid, etc.

Also, the acidity of the conductive polymer solution may be controlled in a range to improve the dispersibility of the conductive particles, the above range depending on characteristics of the particles. A pH range of 1~6 is preferred.

In addition, the present invention provides an electrode comprising: (a) an electrode active material; and (b) the above-mentioned composite particles.

Since the electrode according to the present invention can be manufactured merely by using the electrode active material and the composite particles, manufacturing processes of the electrode can have improved simplicity and cost-efficiency.

While the conventional conductive polymer causes a problem in charge/discharge cycle characteristics when used as an electrode active material, the composite particles according to the present invention maintains their main function as a binder and a conductive agent despite slightly decreased charge/discharge stability. Therefore, the composite particles according to the present invention may not adversely affect the overall charge/discharge cycle characteristics of a cell.

In the composite particles, the conductive polymer and the conductive particles each are used in an amount of 0.01~10 parts by weight based on 100 parts by weight the electrode materials, but are not limited thereto. The electrode according to the present invention may further comprise a binder and a conductive agent generally known to those skilled in the art in addition to the binder.

Non-limiting examples of the binder include Teflon, PVdF (polyvinylidene difluoride), styrene-butadiene rubber (SBR), cellulose-based polymer or a mixture thereof. Also, any conductive agent generally known to those skilled in the art may be used in the present invention. There is no particular limitation in the amount of the binder and conductive agent. However, the binder and conductive agent each are used preferably in an amount of less than the amount current used in an electrode. For example, less than 10 parts by weight of the conductive agent and less than 10 parts by weight of the binder are preferred.

The electrode using the composite particles according to the present invention may be manufactured via a conventional method known to those skilled in the art. In a preferred embodiment, electrode slurry containing an electrode active material and the composite particles is bound to a current collector.

Among the electrode active materials, the cathode active material includes conventional cathode active materials currently used in a cathode for an electrochemical device, and particular examples of the cathode active material include metals, metal alloys, metal oxides, petroleum coke, activated carbon, graphite or other carbonaceous materials. Also, the anode active material may be the same as the above-mentioned cathode active material.

Non-limiting examples of a cathode collector include foil formed of aluminum, nickel or a combination thereof. Non-limiting examples of an anode collector include foil formed of copper, gold, nickel, a copper alloy or a combination thereof.

Further, the present invention provides an electrochemical device comprising a cathode, an anode, a separator and an electrolyte, wherein either or both of the cathode and the anode comprise the above-mentioned composite particles.

The electrochemical device includes any device in which electrochemical reactions are performed. Particular examples of the electrochemical device include all kinds of primary batteries, secondary batteries, fuel cells, solar cells, capacitors, or the like. An adsorption/desorption type electrochemical device that stores energy in it based on the mechanism of charge adsorption/desorption onto/from surfaces of both electrodes is preferred, and particular non-limiting examples of such devices include electric dual layer capacitors, super capacitors, pseudocapacitors, or the like.

The electrochemical device according to the present invention may be obtained by using a method generally known to one skilled in the art. For example, an electrode assembly is formed by using a cathode, an anode and a separator interposed between both electrodes, and then the electrolyte is injected thereto.

There is no particular limitation in the electrolyte that may be used in the present invention, as long as the electrolyte has ion conductivity. For example, an electrolyte comprising an electrolyte salt dissolved or dissociated in an electrolyte solvent may be used.

The electrolyte salt includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof. Additionally, $(CH_3)_4N$ salts, $(C_2H_5)_4N$ salts, etc. may be used.

The electrolyte solvent that may be used in the present invention includes an aqueous solvent or a non-aqueous solvent. Non-limiting examples thereof include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone; GBL), and mixtures thereof.

As the separator, conventional microporous separators known to prevent both electrodes from being in direct contact with each other may be used, and particular examples of such separators include polyolefin-based and/or cellulose-based separators.

BRIEF DESCRIPTION OF THE DRAWINGS

The foregoing and other objects, features and advantages of the present invention will become more apparent from the following detailed description when taken in conjunction with the accompanying drawings in which:

FIG. 1a is a schematic view showing the structure of composite particles comprising a conductive polymer in which conductive particles are distributed, and FIG. 1b is a schematic view showing the structure of an electrode comprising the composite particles as shown in FIG. 1a;

BEST MODE FOR CARRYING OUT THE INVENTION

Figure 1:
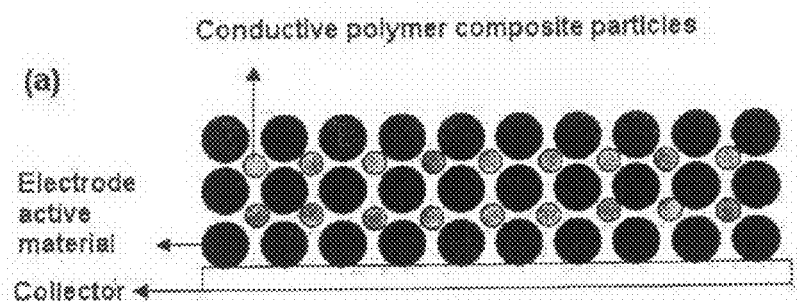
Figure 1:
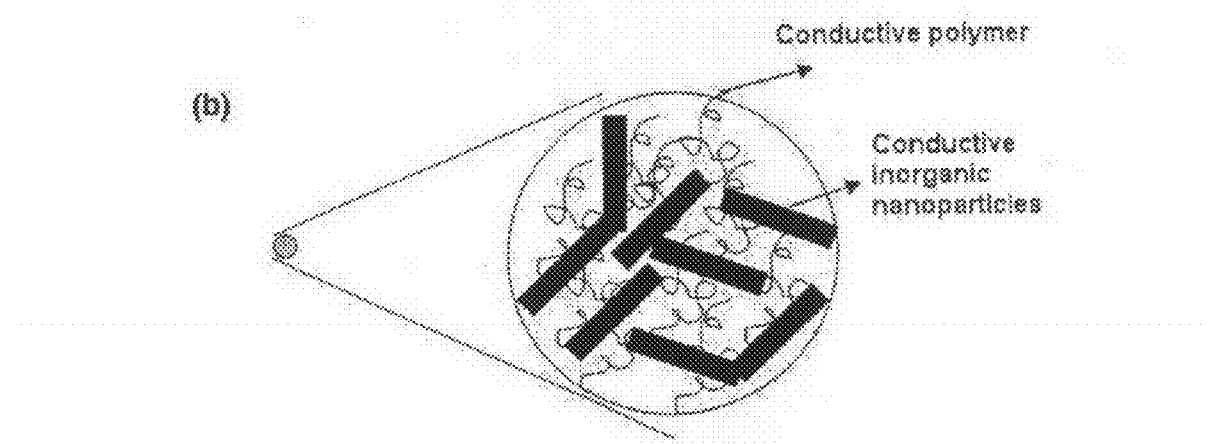

Reference will now be made in detail to the preferred embodiments of the present invention. It is to be understood that the following examples are illustrative only and the present invention is not limited thereto.

EXAMPLE 1

1-1. Preparation of Composite Particles (Conductive Carbon/Conductive Polymer)

To an aqueous solution of a conductive polymer, PEDOT, 2 wt % of carbon nanotubes (thickness: 20 nm, length: 5 μm) were dispersed and the resultant solution was modified to have an acidity of pH 3 so as to improve the dispersibility. The uniformly mixed PEDOT/carbon nanotube slurry was subjected to condensation and drying to provide a PEDOT/carbon nanotube composite. The final composite particles had a diameter of 500 nm.

1-2. Manufacture of Electrode

To distilled water as a solvent, 85 wt % of activated carbon (MSP20, Kansai Coke and Chemicals Co., Ltd.) as an electrode active material, 5 wt % of Super-P (carbon black) spherical particles having a particle size of 500 nm, 5 wt % of PTFE as a non-conductive binder, and 5 wt % of the PEDOT/CNT composite particles obtained as described in Example 1-1 were added to provide a five-component mixture as electrode slurry. The electrode slurry was applied onto aluminum (Al) foil as a cathode collector and a copper foil as an anode collector, each having a thickness of about 20 μm, followed by drying, to provide a cathode and an anode.

1-3. Manufacture of Electrochemical Device

The cathode, a separator and the anode were stacked successively to provide an assembled cell. Then, propylene carbonate (PC) containing 1M tetraethylammonium tetrafluoroborate (TEABF$_4$) dissolved therein was injected to the assembled cell to provide an electric dual layer capacitor having a unit cell.

EXAMPLE 2

An electric dual layer capacitor was provided in the same manner as described in Example 1, except that 95 wt % of activated carbon as an electrode active material and 5 wt % of the PEDOT/CNT composite prepared according to Example 1 were used to provide an electrode. The capacitor obtained in this example 2 showed quality similar to that of the capacitor according to Example 1.

COMPARATIVE EXAMPLE 1

An electric dual layer capacitor was provided in the same manner as described in Example 1, except that 75 wt % of activated carbon as an electrode active material, 10 wt % of Super-P as a conductive agent and 15 wt % of PTFE as a non-conductive binder were used to provide an electrode.

COMPARATIVE EXAMPLE 2

An electric dual layer capacitor was provided in the same manner as described in Example 1, except that the PEDOT/

CNT composite was not used and a conductive polymer, PEDOT, was used alone to provide an electrode.

COMPARATIVE EXAMPLE 3

Example 1 was repeated except that conductive carbon (CNT) was used instead of the PEDOT/CNT composite. However, the electrode film showed a severe peel-off phenomenon so that an electric dual layer capacitor could not be obtained.

TABLE 1

| | Materials for Forming Electrode (100 wt %) | | | |
|---|---|---|---|---|
| | Electrode active material (Activated carbon) | | Conductive agent (Super-P) | Non-conductive binder (PTFE) |
| Ex. 1 | 85 wt % | 5 wt % (PEDOT/CNT) | 5 wt % | 5 wt % |
| Ex. 2 | 95 wt % | 5 wt % (PEDOT/CNT) | — | — |
| Comp. Ex. 1 | 75 wt % | — | 10 wt % | 15 wt % |
| Comp. Ex. 2 | 85 wt % | 5 wt % (PEDOT) | 5 wt % | 5 wt % |
| Comp. Ex. 3 | 85 wt % | 5 wt % (CNT) | 5 wt % | 5 wt % |

EXPERIMENTAL EXAMPLE 1

Adhesion Test

The following test was performed to evaluate the adhesion of the electrode comprising the composite particles according to Example 1. As controls, the electrode comprising the conventional binder according to Comparative Example 1, and the electrodes using either of conductive nanoparticles and a conductive polymer according to Comparative Examples 2 and 3 were used, respectively.

The adhesion test was performed by attaching a tape onto the surface of the electrode active material layer of each electrode and removing the tape therefrom. The amount of each electrode active material layer remaining on the tape after removing the tape was shown in the following Table 2.

After the test, it could be seen that even though the electrode according to Comparative Example 1 used a non-conductive binder (PTFE) in an amount corresponding to at least three times of the amount of the binder in the sample, the tape was stained with the electrode active material. On the contrary, the electrode using composite particles according to Example 1 was not stained with the electrode active material (see the following Table 2).

TABLE 2

| Condition | Ex. 1 | Ex. 2 | Comp. Ex. 1 | Comp. Ex. 2 | Comp. Ex. 3 |
|---|---|---|---|---|---|
| Staining | none | none | Slight staining | none | Staining |
| Cell assemblage | yes | yes | yes | yes | No |

EXPERIMENTAL EXAMPLE 2

Evaluation of Quality of Adsorption/Desorption Type Electrochemical Device

The following test was performed to evaluate the quality of an electrochemical device comprising the composite particles according to the present invention.

2-1. Test for Evaluating Life Characteristics

Figure 2:
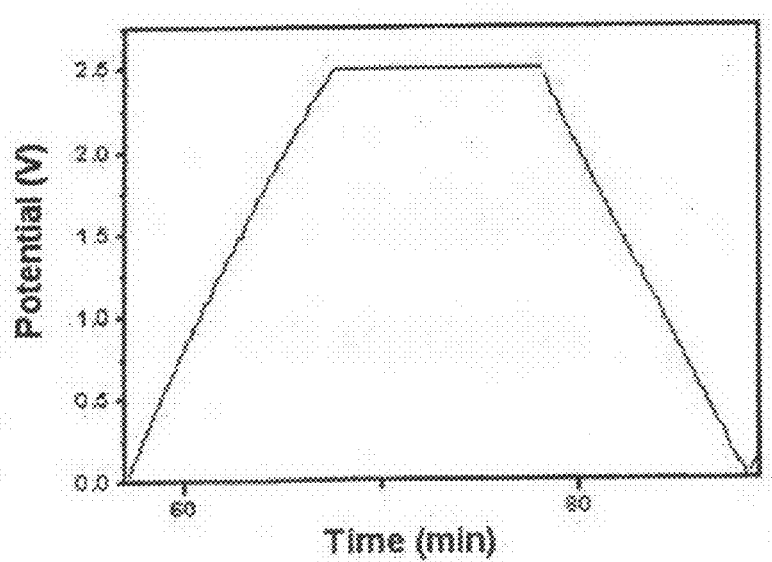
FIG. 2 is a graph showing charge/discharge results of an electric dual layer capacitor including composite particles comprising a conductive polymer in which conductive particles are distributed.
Figure 5:
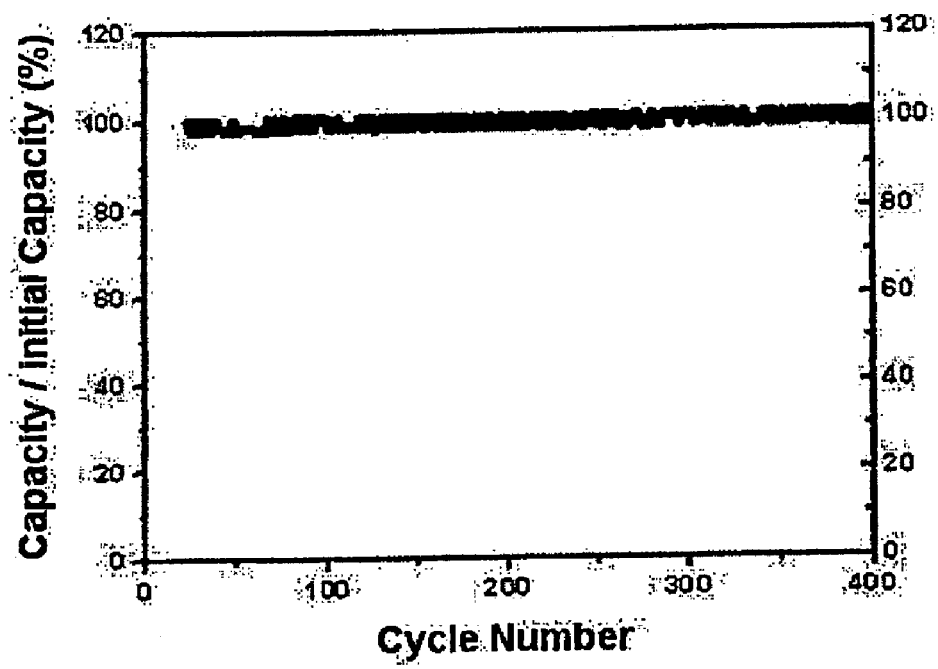
FIG. 5 is a graph showing the discharge capacity of a unit cell obtained by using composite particles comprising a conductive polymer in which conductive particles are distributed, as a function of the number of charge/discharge cycles.

Each of the electric dual layer capacitors according to Examples 1 and 2 was subjected to charge/discharge cycles. The discharge capacity behavior of each capacitor was measured as a function of the number of charge/discharge cycles (see FIGS. 2 and 5).

After the test, it could be seen that the electric dual layer capacitor according to Example 1 maintained the initial discharge capacity even after the lapse of 400 cycles. This indicates that the capacitor according to Example 1 has excellent lifespan characteristics (see FIG. 5). Additionally, the electric dual layer capacitor according to Example 2 showed similar lifespan characteristics.

2-2. Test for Evaluating Specific Capacitance

The electric dual layer capacitors according to Example 1 and Comparative Examples 1 and 2 were evaluated by observing the discharge specific capacitance and specific capacitance behavior as a function of the discharge rate in each capacitor.

When calculating the discharge specific capacitance per total weight of each electrode, the electric dual layer capacitor according to Example 1 showed an increase in the amount of the electrode active material by about 10% or more as compared to the electric dual layer capacitor according to Comparative Example 1, and had a relatively high discharge capacity. Particularly, the capacitor according to Example 1 showed a significantly higher discharge capacity as compared to the capacitor containing the same amount of electrode active material according to Comparative Example 2 (see FIG. 3).

Figure 3:
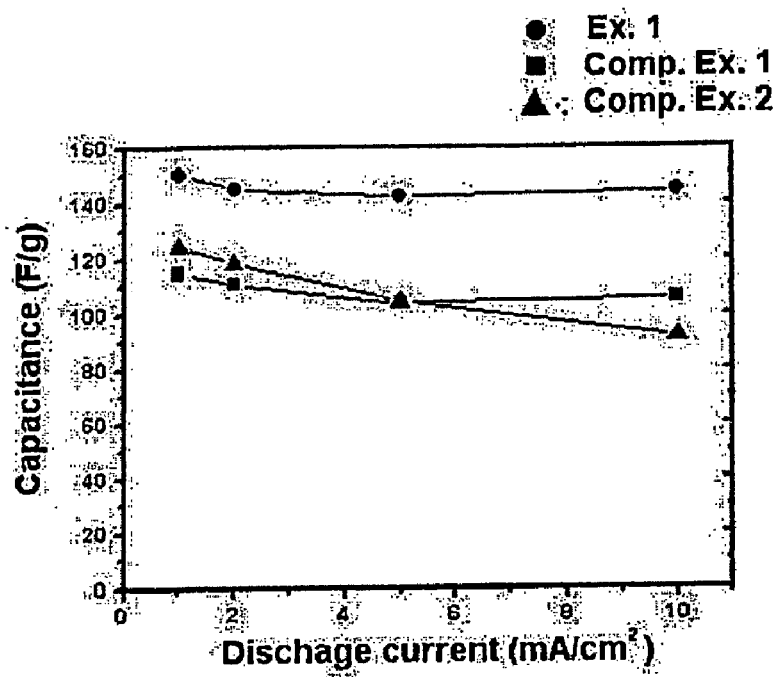
FIG. 3 is a graph showing the discharge capacity per total weight of electrode materials in each of the electric dual layer capacitors according to Examples 1 and Comparative Examples 1 and 2.

On the contrary, it could be seen that the electric dual layer capacitor using a conductive polymer alone instead of the composite particles (PEDOT/CNT) according to Comparative Example 2 was degraded in terms of quality, even though the capacitor used the electrode active material in an amount increased by 10% or more as compared to the capacitor according to Comparative Example 1 (see FIG. 3). This indicates that although the capacity of an electrochemical device has an interrelation with the amount of an electrode active material, a material having excellent conductivity is essentially required for forming an electrode in order to transfer electric charges onto the electrode active material and to impart high capacity to an electrochemical device.

Figure 4:
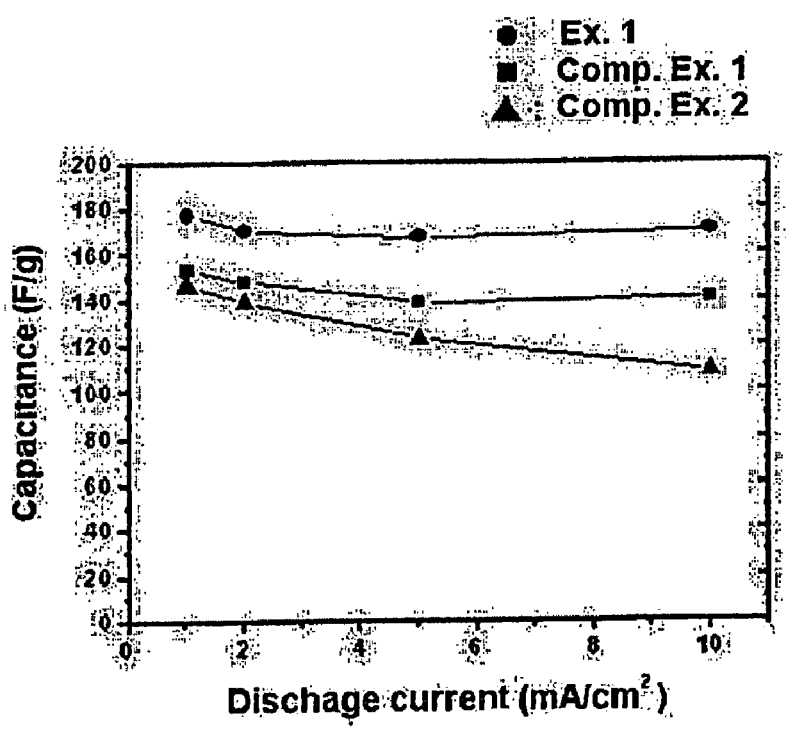
FIG. 4 is a graph showing the discharge capacity per weight of an electrode active material in each of the electric dual layer capacitors according to Examples 1 and Comparative Examples 1 and 2.

Meanwhile, FIG. 4 shows the discharge specific capacitance as a function of the weight of an electrode active material, activated carbon.

It can be seen that the electric dual layer capacitor according to Example 1 shows a higher capacity from the activated carbon as compared to the electric dual layer capacitor according to Comparative Example 1, even though the capacitor according to Example 1 uses a significantly reduced amount of non-conductive binder and conductive agent. This indicates that the composite particles according to the present invention maximizes contribution of an active material to the capacity of an electrochemical device, and the conductive polymer and the conductive nanoparticles in the composite individually contribute to the capacity of an electrochemical device. The electric dual layer capacitor according to Example 2 showed specific capacitance behavior similar to the results of Example 1.

INDUSTRIAL APPLICABILITY

As can be seen from the foregoing, when the composite particles comprising a conductive polymer and conductive inorganic nanoparticles distributed in the conductive polymer are used for forming an electrode, it is possible to obtain electrode film uniformity equal to or higher than that of a conventional electrode system, even in the presence of a smaller amount of binder and conductive agent.

Additionally, such a significant drop in the amount of polymer binder and a conductive agent required for forming an electrode leads to an increase in the weight proportion of an electrode active material as compared to a conventional electrochemical device, resulting in improvement in the capacity of an electrochemical device.

Further, since the conductive carbon and/or the conductive polymer itself can contribute to the capacity, it is possible to improve the quality of an electrochemical device.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. Composite particles for binding electrode active material to form an electrode comprising:
   (a) a conductive polymer; and
   (b) conductive inorganic nanoparticles having a higher conductivity as compared to the conductive polymer, wherein the conductive inorganic nanoparticles are distributed onto a surface of the composite particles and/or inside the composite particles, wherein the composite particles have an adhesion of 10 g/cm or higher to bind the electrode active material to form the electrode.

2. The composite particles as claimed in claim 1, wherein the composite particles have a conductivity of $10^{-2}$-$10^5$ S/cm.

3. The composite particles as claimed in claim 1, wherein the conductive inorganic nanoparticles are spherical, tube-like, fiber-like, rod-like or plate-like particles.

4. The composite particles as claimed in claim 3, wherein the spherical conductive inorganic nanoparticles have a diameter of 0.1-500 nm.

5. The composite particles as claimed in claim 3, wherein the tube-like, fiber-like, rod-like or plate-like particles has a thickness of 0.1-500 nm and a length of 0.01-5 μm.

6. The composite particles as claimed in claim 1, wherein the conductive inorganic nanoparticle is at least one particle selected from the group consisting of metals, metal oxides, metal alloys and carbonaceous materials.

7. The composite particles as claimed in claim 1, wherein the conductive polymer has a molecular weight (Mw) of 1,000-1,000,000.

8. The composite particles as claimed in claim 1, wherein the conductive polymer is gelled when swelled with a dispersant or a solvent for an electrochemical device.

9. The composite particles as claimed in claim 1, wherein the conductive polymer is at least one selected from the group consisting of polyaniline, polypyrrole, polythiophene, PEDOT (poly(ethylenedioxy)thiophene), polyacetylene, polyphenylene and poly(thienylene vinylene).

10. The composite particles as claimed in claim 1, wherein the composite particles are modified in terms of conductivity by introducing a dopant thereto.

11. The composite particles as claimed in claim 1, wherein the conductive inorganic particles and the conductive polymer are used in a weight ratio of 0.01-50:50-99.9.

12. The composite particles as claimed in claim 1, wherein either or both the conductive inorganic nanoparticles and the conductive polymer are capable of serving as an electrode active material and adsorbing electric charges.

13. An electrode comprising:
   (a) an electrode active material; and
   (b) the composite particles as claimed in claim 1.

14. An adsorption/desorption type energy storage device including the electrode as claimed in claim 13.

15. The electrode as claimed in claim 13, wherein the composite particles contain the conductive polymer in an amount of 0.01-10 parts by weight per 100 parts by weight of the electrode materials.

16. The electrode as claimed in claim 13, wherein the composite particles contain the conductive inorganic nanoparticles in an amount of 0.01-10 parts by weight per 100 parts by weight of the electrode materials.

17. The electrode as claimed in claim 13, wherein the electrode further comprises either or both of a non-conductive binder and a conductive agent.

18. An electrochemical device comprising a cathode, an anode, a separator and an electrolyte, wherein either or both of the cathode and the anode are the electrode as claimed in claim 13.

19. The electrochemical device as claimed in claim 18, wherein the electrochemical device is based on an energy storage mechanism via charge adsorption/desorption onto/from surfaces of both electrodes.

* * * * *